United States Patent [19]
Massaro et al.

[11] Patent Number: 5,653,197
[45] Date of Patent: Aug. 5, 1997

[54] PET COLLAR AND STUD ASSEMBLIES

[76] Inventors: Robert D. Massaro, deceased, late of Marina Del Rey, Calif.; by Mona R. Massaro, executrix, 2410 Silver Ridge Ave., Los Angeles, Calif. 90039

[21] Appl. No.: 304,133

[22] Filed: Sep. 12, 1994

[51] Int. Cl.⁶ .................................................. A01K 27/00
[52] U.S. Cl. ........................... 119/858; 40/303; 24/108
[58] Field of Search ........................... 119/856, 857, 119/858, 860, 861, 156, 654, 655; 40/300, 301, 302, 303, 304, 633; 63/3, 11; 24/108

[56] References Cited

U.S. PATENT DOCUMENTS

| | | | |
|---|---|---|---|
| 3,689,962 | 9/1972 | Erickson | 24/108 |
| 3,892,013 | 7/1975 | Gould | 24/108 |
| 4,184,452 | 1/1980 | Buzzell et al. | 119/858 |
| 4,579,493 | 4/1986 | Schaty | 24/108 |
| 4,785,563 | 11/1988 | Friedman | 40/301 |
| 4,970,766 | 11/1990 | Hsiau et al. | 24/108 |
| 5,367,987 | 11/1994 | Lin | 119/858 |

FOREIGN PATENT DOCUMENTS 2198087  3/1958  Australia ................. 40/301

*Primary Examiner*—Todd E. Manahan
*Attorney, Agent, or Firm*—Loeb & Loeb LLP

[57] ABSTRACT

A pet collar is provided with an indicia bearing surface through which a plurality of apertures are provided. Indicia bearing stud assemblies are securable to the collar along the indicia bearing surface. Each stud assembly includes a stud member and a stud-backing member. The stud member has a flat plate on which indicia is printed. A post extends from the surface opposite to the indicia bearing surface of the plate. The post has a generally rectangular cross-section and defines four post walls. Teeth extend from two oppositely facing post walls. The stud-backing member has a post receptacle and two resilient extension members extending into the post receptacle. Each resilient extension members has a plurality of teeth corresponding in shape, but facing opposite, the teeth of the stud post. The stud assembly is connected to the collar by extending the stud post through the aperture in the indicia bearing surface of the collar and by receiving the free end of the stud post in the post receptacle of the stud-backing member. Once received, the teeth of the stud post engage with the teeth of the stud-backing member to lock the stud to the stud-backing member with the collar therebetween.

10 Claims, 3 Drawing Sheets

PET COLLAR AND STUD ASSEMBLIES

BACKGROUND OF THE INVENTION

1. Field of the Invention

The present invention relates to a collar, such as a pet collar, and indicia bearing stud assemblies secured or securable to the collar.

2. Related Art

Identification collars, e.g. for pets, and identification bracelets have been known for quite some time. Typically, these items take the form of an elongated strap having at least one end provided with a connecting device, such as a belt buckle, snaps, a clasp, hook and loop fastening material, or the like, for connecting the two ends of the strap together to form a loop. In use, the loop is formed around a wearers neck (in the case of a collar) or wrist (in the case of a bracelet).

Pet owners typically place a collar, such as described above, around their pets neck for identification purposes. For example, pet collars are known to carry pre-printed or engraved tags carrying identification information, such as the pets name, the owners phone number, etc. Likewise, identification bracelets, to be worn around a wearers wrist, are known to carry identification indicia, such as a pre-printed or engraved name or message.

Generally, such known collars and bracelets are pre-printed or pre-engraved with permanent identification or message indicia. That is, a user must purchase the collar or bracelet pre-printed or pre-engraved or have such printing or engraving performed by a professional before the collar or bracelet is worn for its intended purpose. Typically, the printing or engraving process permanently applies the identification or message indicia to the collar or bracelet. Thus, once the indicia is printed or engraved, the user cannot change the indicia.

Additionally, a common arrangement for having indicia printed or engraved for a particular user requires the user to purchase the collar or bracelet and then have it sent to a professional printer or engraver for printing or engraving the specific message desired. Depending on the printer or engraver, the process of purchasing the collar or bracelet, sending it to a professional printer or engraver, having the printer or engraver apply the message and then return the collar or bracelet may take a relatively long period of time and can be a great inconvenience to the user.

An example of a prior apparatus designed to overcome these above noted deficiencies is shown in FIGS. 6 and 7. FIG. 6 shows a pet collar 100 having indicia bearing stud assemblies 102 secured along its length. The indicia bearing stud assemblies 102 are secured to collar 100 in an arrangement wherein the indicia provides a message, such as the pet's name and the owners phone number.

Known stud assemblies 102, such as show in FIG. 7 include a pin 104 and a pin receptacle 106. Pin 104 includes a backing 108 and a cylindrical post 110 extending from the backing and having a lip 112 at its free end. Receptacle 106 includes a plate 114 having an indicia bearing surface (facing into the page in FIG. 7) and a hollow cylindrical extension 118. The wall of extension 118 is slit in several locations 120 to form plural fingers 122 which are bent into the hollow interior 124 of extension 118. Typically pin 104 and receptacle 106 are made of stamped and formed metal or metal castings.

Stud assemblies 102 are secured to collar 100 by passing pin post 110 through an aperture in collar 100 and receiving the free end of post 110 within the hollow interior of extension 118. Upon receiving post 110, lip 112 is forced past the free ends 124 of fingers 122 to thereby connect pin 104 to receptacle 106 with collar 100 therebetween.

Once connected, pin 104 and receptacle 106 can freely rotate with respect to each other. This is due, in part, to the cylindrical shape of post 110. Additionally, the distance between backing 108 and plate 114 of an assembled stud assembly 102 are fixed and cannot be adjusted before or after connecting pin 104 to receptacle 106. Furthermore, receptacle 106 requires two separately manufactured parts (extension 118 and plate 114) which must be assembled before use. The manner in which fingers 122 bend and extend into the interior of extension 118 makes it impractical, if not impossible, to form receptacle 106 as a single piece structure formed by injection molding or a single piece structure formed by metal stamping.

SUMMARY OF THE DISCLOSURE

The present invention relates to a collar or strap having indicia bearing stud assemblies secured or securable thereto and to indicia bearing stud assemblies which may be secured, e.g., to various types of apparel, accessories, or other items. Embodiments of the invention are designed to allow a user to readily assemble and secure indicia bearing stud assemblies with the collar, or other item, so as to form a desired identification or other message, design or the like on the collar or item. Embodiments of the invention avoid the above discussed problems associated with prior identification collars or bracelets by providing a relatively simple, fast and inexpensive means by which a user may apply indicia to a collar, strap or other item.

According to an embodiment of the invention, a pet collar is composed of an elongated leather strap having one-end provided with a buckle connector, an opposite end provided with apertures for engaging the buckle connector, and a surface area between the two ends for carrying identification indicia. The surface area for carrying identification indicia is provided with a plurality of generally oval apertures extending through the collar and arranged in a row along a portion of the length of the collar. The apertures provide passages through which indicia bearing stud assemblies extend.

Each stud assembly according to embodiments of the invention comprises two elements which can be assembled into an "assembled stud assembly". One of these stud assembly elements, the "stud-backing member", is arranged adjacent the inner surface of the collar (the surface defining the inner periphery of a loop formed by connecting the two ends of the strap together). The other stud assembly element, the "stud", is arranged adjacent the outer surface of the collar (the surface defining the outer periphery of the loop). The stud has a post which extends through an aperture in the collar and connects to the stud-backing member adjacent the inside surface of the collar.

The stud according to embodiments of the invention comprises a plate-like member having a generally flat surface on which indicia is pre-printed. Extending from the opposite surface of the plate is a post. The post has a generally rectangular cross-section and preferably is provided with a plurality of teeth extending from at least two sides thereof. Each tooth on the post has a shoulder portion and a beveled wall portion.

The stud backing member according to embodiments of the invention comprises a generally flat base from which a post receptacle extends. The post receptacle comprises a generally rectangular, hollow tube which extends a short distance from the flat base. Preferably, at least two resilient extension members extend into the interior of the hollow tube. Each resilient extension member is provided with a plurality of teeth shaped similar to but facing opposite the teeth on the post. The post receptacle is configured to receive the post, whereby the teeth of the post engage with the opposite facing teeth of the resilient extension members so as to rotatably lock the stud with the stud-backing member.

These and other embodiments, and advantages thereof, will become apparent from the following detailed description and the accompanying drawings.

BRIEF DESCRIPTION OF THE DRAWINGS

The detailed description of embodiments of the invention will be made with reference to the accompanying drawings, wherein like numerals designate corresponding parts to the several figures.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating general principals of embodiments of the invention. The scope of the invention is best defined by the appended claims.

The present invention relates to a collar or strap having indicia bearing stud assemblies secured or securable thereto and to indicia bearing stud assemblies which may be secured, e.g., to various types of apparel or other items. Embodiments of the invention are designed to allow a user to readily assemble indicia bearing stud assemblies with the collar so as to form identification indicia, a message, a design or the like. The stud assemblies according to embodiments of the invention are designed to be readily assembled without the use of tools and without the need for specialized knowledge or skills. While the following description relates to a pet collar apparatus, it will be readily apparent that the present invention may be applied to various other items and apparel to be connected generally, and bracelets, belts, hats, purses or the like as specific examples.

Figure 1:
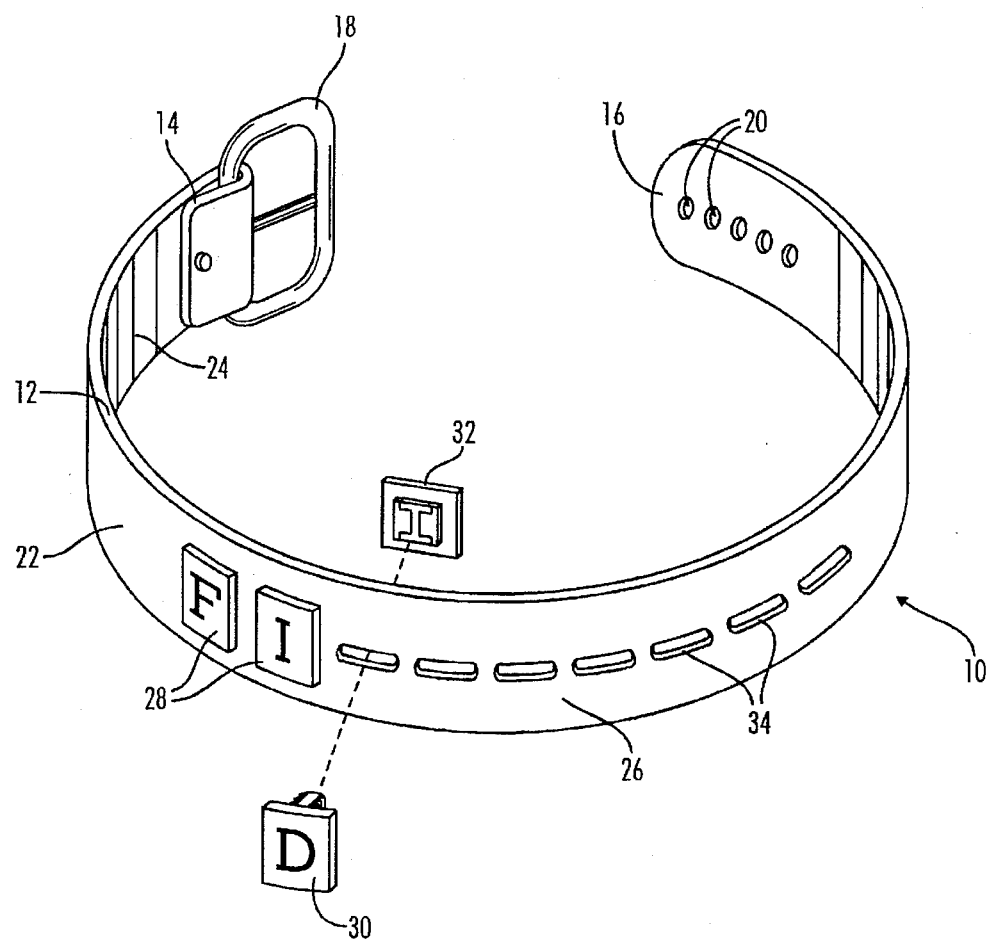
FIG. 1 is a perspective view of a pet collar and stud assemblies according to an embodiment of the present invention.

FIG. 1 shows a pet collar 10 according to an embodiment of the present invention. Collar 10 comprises an elongated strap 12 made of, for example, leather. However, other suitable materials (such as vinyl, woven fabric, plastic, or the like) may be employed as an alternative to the leather.

Strap 12 has two ends 14 and 16 and apparatus for connecting the two ends together to form a loop. In FIG. 1, the connecting apparatus comprises a standard buckle 18 connected to strap end 14 and a plurality of generally circular apertures 20 provided along a portion of the length of strap 12 adjacent strap end 16. Buckle 18 and apertures 20 operate, in a well known manner, to secure ends 14 and 16 together. Further embodiments of the invention may include other types of mechanisms for securing strap ends 14 and 16 together, such as Snaps, clasps, hook and loop fastening material (such as the type sold under the trademark VELCRO), or the like.

When strap ends 14 and 16 are connected together, strap 12 forms a loop defining an outer peripheral surface 22 and an inner peripheral surface 24. When in use, the inner peripheral surface 24 will face and lie against the wearer's (the pet's) neck while the outer peripheral surface 22 will face away from the wearer.

A portion of the outer surface of strap 12, between ends 14 and 16, defines an indicia bearing surface 26. As described in further detail below, stud assemblies having indicia bearing studs are connected or connectable to strap 12 along indicia bearing surface 26. As shown in FIG. 1, an unassembled stud assembly according to an embodiment of the invention has an indicia bearing stud 30 and a stud-backing member 32. Each stud 30 connects with a stud-backing member 32 to form an "assembled stud assembly".

Strap 12 is provided with a plurality of generally oval shaped apertures 34 arranged in a row along the length of indicia bearing surface 26. Each aperture 34 extends through strap 12 from outer surface 22 to inner surface 24 and defines a passage through which a portion of a stud assembly may pass, as discussed in further detail below.

Figure 2:
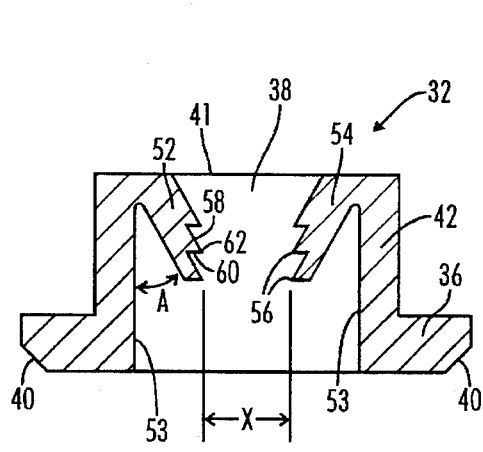
FIG. 2 is a cross section view of a stud-backing member according to an embodiment of the present invention.
Figure 3:
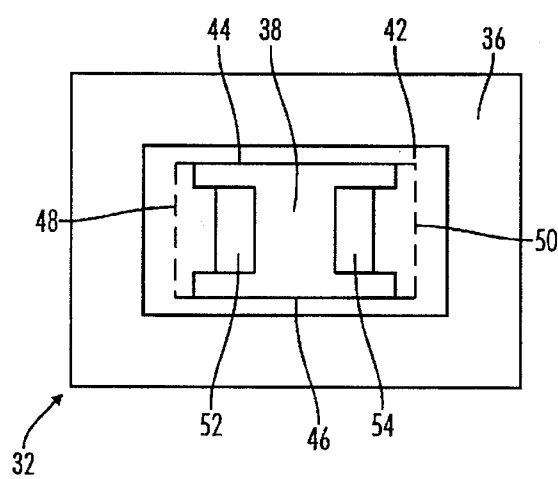
FIG. 3 is a top view of the stud-backing member of FIG. 2.

FIGS. 2 and 3 show a stud-backing member 32 according to an embodiment of the present invention. Stud backing member 32 comprises a generally rectangular, flat base 36 defining a central aperture 38. The bottom surface (with respect to the orientation of stud-backing member 32 shown in FIG. 2) is beveled around its edge, as shown at 40, so as to eliminate sharp edges which would, otherwise, cause discomfort to the wearer.

A post receptacle 42 extends from the upper surface (with respect to the orientation shown in FIG. 2) of base 36. Post receptacle 42 comprises a generally hollow, rectangular tube structure having one end extending from base 36 and an opposite free end 44.

Free end 44 of receptacle 42 defines four edges 41, 46, 48 and 50. Two opposite edges, 48 and 50, have resilient extension members 52 and 54, respectively, extending therefrom. That is, a first resilient extension member 52 extends from edge 48 and a second resilient member 54 extends from edge 50 (see FIG. 3). When the stud-backing member 32 is not connected with the stud 30, each extension member 52 and 54 extends at an angle "A" from the inner surface 53 of the generally rectangular tube defined by receptacle 42. By virtue of the resilience of resilient extension numbers 52 and 54, each extension member 52 and 54 may be resiliently moved or bent so as to alter this angle "A". However, the resiliency of extension members 52 and 54 will urge these extension members toward the position wherein they will form the angle "A" with inner surface 53.

As shown in FIG. 2, each resilient extension member 52 and 54 has a plurality of teeth 56 extended toward the central axis of the tube defined by receptacle 42. Each tooth 56 comprises a tapered wall portion 58 and a shoulder portion 60. Each tapered wall portion 58 defines an angled surface which meets a shoulder portion 60 at a point 62. Each shoulder portion 60 defines a substantially horizontal surface facing the bottom (with respect to FIG. 2) of stud-backing member 32. With resilient extension members 52 and 54 each defining the angle "A" with respect to the interior surface of receptacle 42, the width between points 62 of resilient extension member 52 and points 62 of resilient extension member 54 is identified in FIG. 2 as width "X".

In the FIG. 2 embodiment, each resilient extension member 52 and 54 has three teeth 56. However, it will be recognized that any suitable number of teeth may be employed. For example, an embodiment employing a single tooth on each resilient extension member 52 and 54 is contemplated. However, for purposes of durability and holding strength, it is preferred that each resilient extension member 52 and 54 be provided with a plurality of teeth of 56. As will be described in further detail below, post receptacle 42 of stud-backing member 32 is configured to receive a stud post 70 in a manner such that teeth 56 of extension members 52 and 54 engaged with corresponding teeth provided on the stud post to rotatably fix the post 70 with respect to the receptacle 42.

Figure 4:
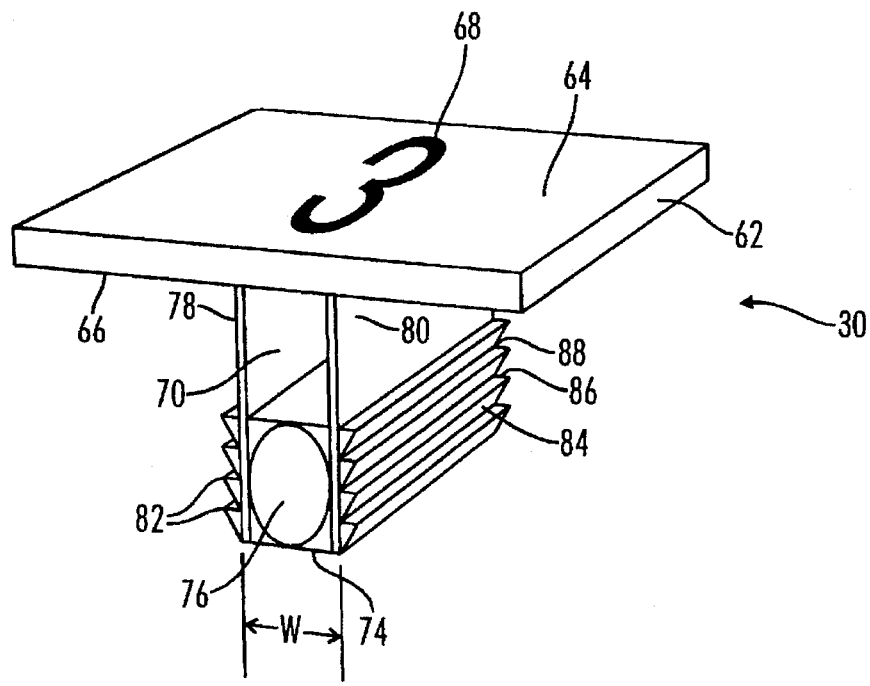
FIG. 4 is a perspective view of a stud according to an embodiment of the present invention.

FIG. 4 shows a stud 30 according to an embodiment of the present invention. Stud 30 comprises a generally rectangular flat plate member 62 having a first surface 64 (facing upward in FIG. 4) and a second surface 66 (facing downward and hidden from view in FIG. 4). Other embodiments may employ plate members having geometric shapes other than the generally rectangular flat shape shown in FIG. 4. Indicia, such as a single character 68, plural characters (not shown) or a design (not shown) is printed or affixed to first surface 64.

A post 70 extends, at its first end 72 (FIG. 5), from the second surface 66 of plate 62. Post 70 has a free end 74 opposite to end 72. Preferably, post 70 is centrally located with respect to plate 62.

Figure 5:
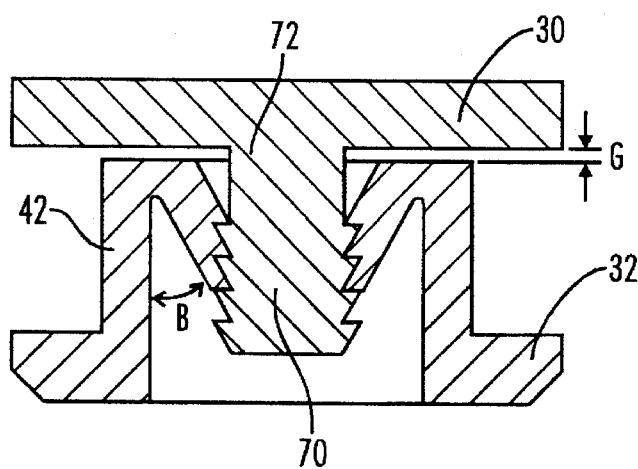
FIG. 5 is a cross section view of an assembled stud assembly according to the embodiments shown in FIGS. 2–4.
Figure 7:
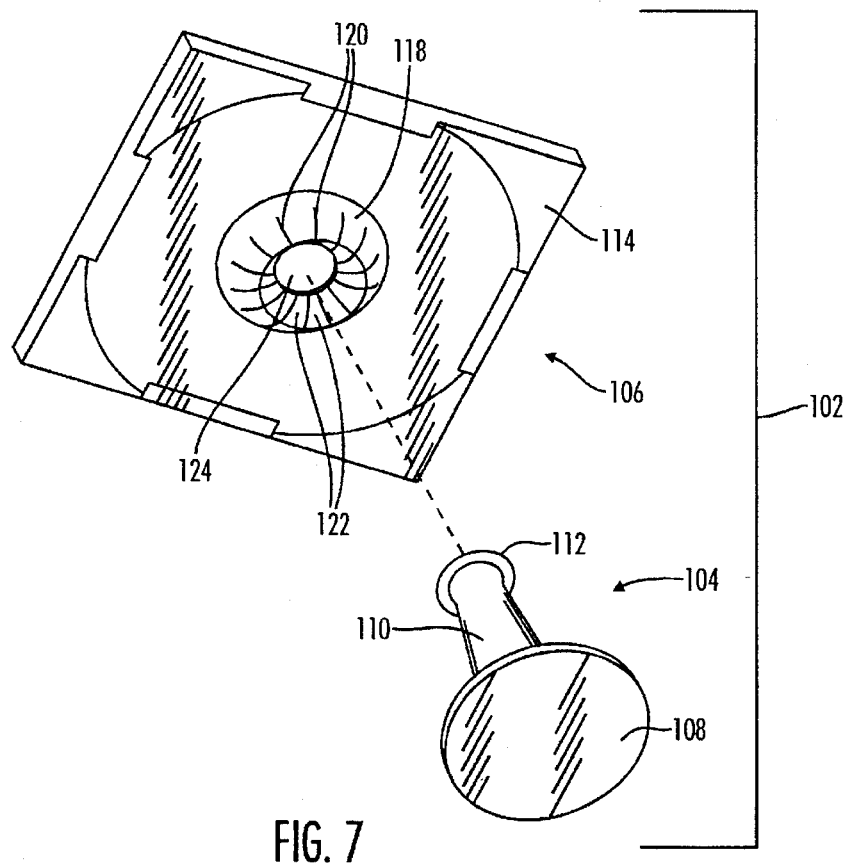
FIG. 7 is a perspective view of a prior art stud assembly.
Figure 6:
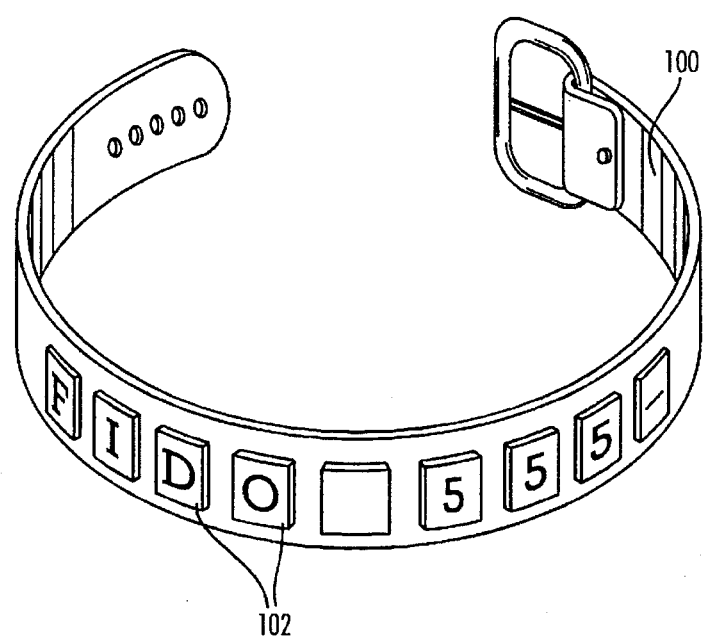
FIG. 6 is a perspective view of a prior art pet collar.

Post 70 has a generally rectangular cross-section and, therefore, defines four post walls 76, 78, 80 and a post wall opposite to wall 76 (hidden from view in FIG. 4). Two opposite facing post walls, 78 and 80, are each provided with a plurality of teeth 82. Each tooth 82 has a similar but opposite facing configuration with respect to the configuration of each tooth 56 of stud-backing member 32. That is, each tooth 82 has a tapered wall portion 84 defining a angled surface similar to, but oppositely facing, the angled surface defined by tapered wall 58 of a tooth 56. Additionally, each tooth 82 has a shoulder portion 86 which defines a substantially flat surface similar to, but oppositely facing the flat surface defined by shoulder portion 60 of each tooth 56. This configuration of teeth 82 and 56 defining oppositely facing surfaces allows the teeth 82 and 56 to mesh together in a manner as shown in FIG. 5. That is the teeth 82 and 56, press against each other.

In the FIG. 4 embodiment, each post wall 78 and 80 has four teeth 82. However, it will be recognized that any suitable number of teeth may be employed. For example, an embodiment employing a single tooth on each post wall 78 and 80 is contemplated. However, for purposes of durability and holding strength, it is preferred that each post wall 78 and 80 be provided with a plurality of teeth of 82.

Referring to FIG. 4, the tapered wall portion 84 of one tooth 82 meets the shoulder of an adjacent tooth 82 at a corner 88. The width of post 70, as defined by the distance between corners 88 of teeth 82 arranged along wall 80 and corners 88 of teeth 82 arranged along wall 78, is identified in FIG. 4 as width "W". Preferably, width "W" is greater than the width "X" between points 62 of resilient extension members 52 and 54 (FIG. 2).

Stud 30 and stud-backing number 32 are securable to each other so as to form an assembled stud assembly 28, such as shown in FIG. 5. Referring to FIG. 5, stud 30 secures with stud-backing member 32 by inserting post 70 into the hollow interior of the generally rectangular tube defined by post receptacle 42, with post walls 78 and 80 facing first and second resilient extension members 52 and 54, respectively. In this manner, teeth 82 of stud post 70 engage with teeth 56 of stud-backing member 32 so as to lock stud 30 and stud-backing member 32 together.

Since the width "W" of post 70 is larger than the distance "X" between resilient extension members 52 and 54, each resilient extension member 52 and 54, will be pushed by stud 30 toward the interior surface 53 of post receptacle 42 as stud 30 is received by post receptacle 42. However, by virtue of resilience of resilient extension members 52 and 54, these members will be urged against post walls 78 and 80, respectively, to force teeth 56 and 82 into engagement and to, thereby, securely lock stud 30 and stud-backing member 32 together. Preferably, when assembled, resilient extension members 52 and 54 define an angle "B" with the interior surface of receptacle 42, wherein angle "B" is less than angle "A". This insures that resilient extension members 52 and 54 will continue to urge or press against post walls 78 and 80 such that teeth 56 are securely meshed with teeth 82 as shown in FIG. 5.

As shown in FIG. 5, when assembled, stud 30 and stud-backing number 32 define a gap "G" therebetween. This gap "G" preferably should correspond to or be slightly less than the width of the collar between outer surface 22 and inner surface 24 so that stud 30 and stud-backing number 32 may be tightly secured to collar 10 as described below.

According to preferred embodiments of the invention, gap "G" may be adjustable to accommodate various thicknesses of various collars or other items to which stud 30 and stud-backing number 32 may be secured. For example, stud 30 may be assembled with stud-backing member 32 so as to define a relatively small gap "G" (not shown) when the three teeth of each resilient member 52 and 54 mesh with the upper (with respect to FIG. 5) three teeth of stud 30. Alternatively, stud 30 and stud-backing number 32 may be secured to each other in a manner so as to define a large gap than gap "G" as shown in FIG. 5 by inserting stud 30 into receptacle 42 only so far as to allow the three teeth of each resilient member 52 and 54 to mesh with the lower (with respect to FIG. 5) three teeth of stud 30. Further embodiments may be provided with a greater or lesser number of teeth on each of the resilient extension members 52 and 54 and/or the stud post 70 to provide a greater or lesser degree of adjustability of gap "G".

As mentioned above, teeth 82 of stud post 70 extend from only two of the four post walls. In this manner, stud 30 and stud-backing member 32 may be connected to each other in only two different orientations, e.g. with post wall 78 adjacent to resilient extension member 52 or, alternatively, with post wall 80 adjacent to resilient extension member 52. In this manner, the number of possible orientations of stud 30 with respect to stud-backing member 32 is limited to two, thereby, simplifying the process of assembling the indicia bearing stud assemblies with the indicia of a plurality of assemblies being oriented the same way. In this regard, a user is more likely to assemble a plurality of indicia bearing stud assemblies with the letters, numbers or other indicia of all of the assemblies being oriented in the same direction.

Referring again to FIG. 1, stud assemblies 28 are secured to strap 12 by assembling the stud assemblies 28 in the manner discussed above, and with strap 12 extending between the stud 30 and stud-backing member 32 of each assembly. This is accomplished by the following process:

a stud 30 is positioned adjacent outer surface 22 of strap 12;

post 70 of stud 30 is passed through aperture 34 of strap 12;

stud-backing number 32 is arranged adjacent inner surface 24 of strap 12;

the free end of post 70 extending through aperture 34 is received by post receptacle 42 of stud-backing number 32; and teeth 82 of stud post 70 are engaged with teeth 56 of stud-backing number 32 by squeezing stud 30 and stud-backing number 32 toward each other with strap 12 therebetween.

Preferably, the force needed to squeeze stud 30 and stud-backing member 32 together may be provided without the use of tools, e.g., by merely squeezing these members together between a user's (e.g., the pet owner's) forefinger and thumb.

Once teeth 82 and teeth 56 are engaged, as discussed above, stud 30 and stud-backing member 32 are permanently locked together. However, it is contemplated that other embodiments may provide a non-permanent connection between stud 30 and stud-backing member 32, such as by designing resilient extension members 52 and 54 with a resiliency force which may be overcome by pulling apart stud 30 and stud-backing member 32 with sufficient force. Additionally, the walls of post receptacle 42 may be provided with a slight amount of resiliency which would allow stud 30 and stud-backing member 32 to be separated by pulling these members apart with a suitable amount of force. It is also contemplated that an assembled stud assembly may be removed from strap 12 by physically breaking the structure, e.g., by pulling plate 62 off of post 70 or by breaking resilient extension members 52 and 54 or teeth 82 or 56. In this manner, an assembled stud assembly may be broken off or removed of strap 12 and replaced with another stud assembly.

Stud 30 and stud-backing member 32 may be made of the same or different materials, including A.B.S., Nylon and Delrin. In a preferred embodiment, stud 30 and the stud-backing member 32 are each made of a relatively inexpensive material in a relatively inexpensive manner, such as by injection molding polypropylene.

By virtue of the generally rectangle cross-section of post 70, stud 30 will not rotate with respect to stud-backing member 32 upon assembling these members. This helps insure that indicia 68 on stud 30 remains in a proper orientation once the stud assembly is assembled. However, it will be recognized that other suitable cross-section shapes may be employed for achieving similar benefits. For example, it is contemplated that stud posts having a cross-section in the form of a triangle, pentagon, hexagon, other type of polygon or the like may be similarly employed. In such embodiments, the configuration of post-receptacle 42 and the position of resilient extension members 52 and 54 would be designed to correspond to the teeth bearing post walls of post 70.

When assembled and secured to strap 12, stud assemblies 28 provide an orderly, aesthetically pleasing arrangement of indicia along indicia bearing surface 26. Preferably, the stud assemblies securely lock into place in a fixed relationship with respect to strap 12. It is also preferred that a small space remain between adjacent assembled stud assemblies such that strap 12 will remain flexible, at least between adjacent stud assemblies.

According to the illustrated embodiment, the assembled stud assemblies 28 provide a smooth back surface facing the wearer's neck. This is due to the smooth, generally flat back surface (the bottom surface in FIG. 2) of base 36. The bottom edge (with respect to FIG. 2) of base 36 may have a taper 40, as described above, to avoid sharp edges which might otherwise cause discomfort to the wearer.

In the FIG. 1 embodiment, apertures 34 are generally oval shaped and elongated in the elongated direction of strap 12. In this manner, the position along the length of strap 12 of each stud 30 may be slightly adjusted prior to fully locking stud 30 with stud-backing member 32. Additionally, in arrangements wherein stud 30 and stud-backing member 32 do not tightly grip strap 50 when assembled, stud 30 may be adjusted along the length of strap 12 even after the stud assembly is fully assembled. Alternative embodiments may be provided with circular apertures or rectangular apertures instead of the generally oval apertures 34 shown in FIG. 1.

While the illustrated embodiment described above relates to a pet collar, it will be understood that the above discussed stud assemblies, and equivalence thereof, may be readily employed with an identification bracelet to be worn about a wearers wrist, a belt to be worn about a wearers waist, or the like. Additionally, it will be recognized that the stud assemblies described above, and equivalence, may be readily employed with other types of apparel or non-apparel items. For example, such stud assemblies may be used for placing identification or message indicia on various apparel, including hats, shirts, pants, jackets, shoes, or the like. Additionally or alternatively, such stud assemblies may be used to apply identification or message indicia on non-apparel items, including back-packs, purses, wallets, luggage, or the like. Embodiments of the present invention can take a variety of forms, e.g., individual stud assemblies, stud assemblies assembled with a collar or other item, or a plurality of stud assemblies and a collar or other item provided as a kit.

While the description above refers to particular embodiments of the present invention, it will be understood that many modifications may be made without departing from the spirit and scope thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of the equivalency of the claims are therefore intended to be embraced therein.

What is claimed is:

1. A collar comprising:

an elongated strap having two ends and a portion extending between the two ends, wherein the strap portion extending between the two ends has an aperture therein;

means for connecting the two ends of the strap together to form a loop defining an inner peripheral surface and an outer peripheral surface; and a stud assembly secured to the strap portion between the two ends, the stud assembly having a post extending through the strap portion, the post having a plurality of teeth extending therefrom wherein the stud assembly comprises a plate defining a surface for bearing indicia, the post extending from the plate and passing through the aperture, the stud assembly further comprises a stud backing member secured to the post;

wherein the plate of the stud assembly is disposed adjacent the outer peripheral surface of the strap and the stud backing member is disposed adjacent the inner peripheral surface of the strap; and wherein the stud backing member comprises:

a post receptacle comprising a generally hollow tube;

at least one resilient extension member extending into the generally hollow interior of the tube;

a plurality of teeth extending from the at least one resilient extension member.

2. A collar as claimed in claim 1, wherein:

the strap portion extending between the two ends has a plurality of apertures therein;

the collar further comprises a plurality of stud assemblies corresponding in number to the plurality of apertures, each stud assembly being associated with a respective aperture.

3. A collar as claimed in claim 1, wherein each tooth extending from the post has a shoulder provided substantially perpendicular to the post and a tapered portion extending from the shoulder to the post.

4. A collar as claimed in claim 1, wherein the at least one resilient extension member comprises two resilient extension members.

5. A collar as claimed in claim 1, wherein the tube has a generally rectangular cross-section and the post has a corresponding rectangular cross-section.

6. A collar for an animal, the collar comprising:

an elongated strap having two ends and a portion extending between the two ends, the strap portion extending between the two ends having a plurality of apertures therein;

means for connecting the two ends of the strap together to form a loop defining an inner peripheral surface and an outer peripheral surface; and a plurality of stud assemblies secured to the strap portion between the two ends, each stud assembly having a stud member and a stud backing member, each stud assembly being associated with a corresponding one of the apertures in the strap portion;

each stud member comprises a plate defining a surface for bearing indicia and a post extending from the plate and passing through the aperture associated therewith, the post of each stud assembly having a generally rectangular cross-section defining four post walls, at least two oppositely facing walls of the four post walls each have a plurality of teeth extending therefrom, each tooth extending from the post walls has a shoulder provided substantially perpendicular to the post walls and a tapered portion extending from the shoulder to the post wall from which the tooth extends;

each stud-backing member comprises a post receptacle configured to receive a portion of the post, the post receptacle defining a generally hollow tube having a generally rectangular cross-section, a pair of resilient extension members extending into the generally hollow interior of the tube and a plurality of teeth extending from each resilient extension member, the plurality of teeth of the stud-backing member being disposed to engage the teeth extending from the post walls upon receipt of a portion of the post by the post receptacle, each tooth of the stud-backing member having a shoulder and a tapered portion configured similar but facing opposite the shoulders and tapered wall portions of the teeth extending from the post walls;

wherein the plate of the stud assembly is disposed adjacent the outer peripheral surface of the strap and the stud backing member is disposed adjacent the inner peripheral surface of the strap.

7. A collar comprising:

an elongated strap having two ends and a portion extending between the two ends, wherein the strap portion extending between the two ends has an aperture therein;

means for connecting the two ends of the strap together to form a loop defining an inner peripheral surface and an outer peripheral surface; and a stud assembly secured to the strap portion between the two ends, the stud assembly having a post extending through the strap portion, the post having a generally rectangular cross-section defining four post walls, at least two opposite facing walls of the four post walls each having a plurality of teeth extending therefrom wherein the stud assembly comprises a plate defining a surface for bearing indicia, the post extending from the plate and passing through the aperture, the stud assembly further comprises a stud backing member secured to the post;

wherein the plate of the stud assembly is disposed adjacent the outer peripheral surface of the strap and the stud backing member is disposed adjacent the inner peripheral surface of the strap; and wherein the stud backing member comprises:

a post receptacle comprising a generally hollow tube;

at least one resilient extension member extending into the generally hollow interior of the tube;

a plurality of teeth extending from the at least one resilient extension member.

8. A collar as claimed in claim 7, wherein the at least one resilient extension member comprises two resilient extension members.

9. A collar as claimed in claim 7, wherein the tube has a generally rectangular cross-section.

10. A collar as claimed in claim 7, wherein:

each tooth extending from the post walls has a shoulder being substantially perpendicular to the post walls and a tapered portion extending from the shoulder to the post wall from which the tooth extends; and each tooth of the stud-backing member has a shoulder and a tapered portion configured similar but facing opposite the shoulders and tapered wall portions of the teeth extending from the post walls.

* * * * *